US012704682B2

(12) United States Patent
Arbore et al.

(10) Patent No.: US 12,704,682 B2
(45) Date of Patent: Aug. 11, 2026

(54) WAVELENGTH AGILE MULTIPLEXING

(71) Applicant: Apple Inc., Cupertino, CA (US)

(72) Inventors: Mark Alan Arbore, Los Altos, CA (US); Alfredo Bismuto, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 310 days.

(21) Appl. No.: 18/389,080

(22) Filed: Nov. 13, 2023

(65) Prior Publication Data

US 2024/0077679 A1 Mar. 7, 2024

Related U.S. Application Data

(63) Continuation of application No. 17/479,987, filed on Sep. 20, 2021, now Pat. No. 11,815,719.

(60) Provisional application No. 63/083,507, filed on Sep. 25, 2020.

(51) Int. Cl.
*G02B 6/293* (2006.01)
*H04J 14/02* (2006.01)

(52) U.S. Cl.
CPC ....... *G02B 6/2938* (2013.01); *G02B 6/29307* (2013.01); *G02B 6/29308* (2013.01); *G02B 6/2931* (2013.01); *H04J 14/0205* (2013.01)

(58) Field of Classification Search
CPC ............ G02B 6/29307; G02B 6/29308; G02B 6/2931; G02B 6/2938; H04J 14/0205
See application file for complete search history.

(56) References Cited

U.S. PATENT DOCUMENTS 3,920,314 A 11/1975 Hiroyoshi
5,379,354 A 1/1995 Jenkins
5,617,439 A 4/1997 Kakimoto
(Continued)

FOREIGN PATENT DOCUMENTS

CN 101278508 10/2008
CN 201177670 Y 1/2009
(Continued)

OTHER PUBLICATIONS

Li et al., "Compact and low-loss silicon power splitter based on inverse tapers" (Oct. 2013) Optics Letters 38(20): 4220-4223.
(Continued)

*Primary Examiner* — Ryan A Lepisto
(74) *Attorney, Agent, or Firm* — Brownstein Hyatt Farber Schreck, LLP

(57) ABSTRACT

Methods and systems concerning demultiplexing and multiplexing light in optical multiplexing systems are disclosed herein. An optical multiplexing system may include a number of light emitters and a number of associated waveguides. Light emitted from each of the number of light emitters may travel through the associated waveguide and may enter a multiplexer, where a multiplexing operation may occur. At least one of the number of light emitters may be configured to emit light with multiple wavelengths. Such a light emitter may further be associated with a demultiplexer to demultiplex the light with multiple wavelengths before the light reaches a multiplexer. After a demultiplexing operation, the demultiplexed light may be directed to multiple waveguides and the multiple waveguides may guide the demultiplexed light to a multiplexer.

16 Claims, 10 Drawing Sheets

(56) References Cited

U.S. PATENT DOCUMENTS 5,818,989 A 10/1998 Nakamura
5,848,088 A 12/1998 Mori et al.
5,923,801 A 7/1999 Werner et al.
5,940,556 A 8/1999 Moslehi et al.
6,031,243 A 2/2000 Taylor
6,330,265 B1 12/2001 Kinoshita
6,345,133 B1 2/2002 Morozov
6,393,185 B1 5/2002 Deacon
6,556,688 B1 4/2003 Ratnakar
6,584,136 B2 6/2003 Ju et al.
6,904,203 B2 * 6/2005 Logvin .............. G02B 6/12007 385/47
6,937,795 B2 * 8/2005 Squires .............. G02B 6/12019 398/79
6,954,568 B2 10/2005 Liu
7,269,356 B2 9/2007 Winzer
7,314,451 B2 1/2008 Halperin et al.
7,444,048 B2 10/2008 Peters et al.
7,689,075 B2 3/2010 Jenkins et al.
8,300,994 B2 10/2012 Welch et al.
8,463,088 B1 * 6/2013 Asghari ................ H01S 5/4087 385/27
8,463,345 B2 6/2013 Kuhn et al.
8,515,217 B2 8/2013 Bernasconi et al.
8,724,100 B1 5/2014 Asghari et al.
8,737,846 B2 * 5/2014 Zheng .................. H04B 10/572 359/558
8,920,332 B2 12/2014 Hong et al.
8,964,796 B2 2/2015 Wunderer et al.
9,028,123 B2 5/2015 Nichol et al.
9,088,371 B2 * 7/2015 Witzens ............. H04B 10/6164
9,112,330 B2 8/2015 Gronenborn et al.
9,135,397 B2 9/2015 Denyer et al.
9,151,894 B2 10/2015 Okano et al.
9,312,960 B1 * 4/2016 Feng .................... H04B 10/516
9,369,201 B2 * 6/2016 Luo .................... H04B 10/0775
9,370,689 B2 6/2016 Guillama et al.
9,643,181 B1 5/2017 Chang
9,766,370 B2 9/2017 Aloe et al.
9,819,435 B2 * 11/2017 Lipson ............... G02B 6/12007
9,875,560 B2 1/2018 Rajagopalan
9,943,237 B2 4/2018 Baker et al.
9,946,020 B1 4/2018 Horth
10,016,613 B2 7/2018 Kavounas et al.
10,136,859 B2 11/2018 Cutaia
10,203,454 B2 2/2019 Liu
10,238,351 B2 3/2019 Halperin et al.
10,243,684 B2 3/2019 Wen
10,285,898 B2 5/2019 Douglas et al.
10,290,994 B2 5/2019 Uchida et al.
10,687,718 B2 6/2020 Allec et al.
10,996,399 B2 5/2021 Yang et al.
11,156,497 B2 10/2021 Bismuto et al.
11,158,996 B2 10/2021 Bismuto et al.
11,500,154 B1 11/2022 Wu et al.
11,713,999 B2 8/2023 Bismuto et al.
2005/0031267 A1 2/2005 Sumimoto
2005/0053112 A1 3/2005 Shams-Zadeh-Amiri
2006/0039646 A1 2/2006 Nashimoto
2007/0118054 A1 5/2007 Pinhas et al.
2010/0158067 A1 6/2010 Nakatsuka et al.
2010/0265983 A1 10/2010 Adachi et al.
2011/0249936 A1 10/2011 Welch et al.
2014/0169737 A1 * 6/2014 Zheng .................. G02B 6/4215 385/37
2014/0350360 A1 11/2014 Halperin et al.
2015/0333482 A1 11/2015 Briggs et al.
2016/0224750 A1 8/2016 Kethman et al.
2017/0164878 A1 6/2017 Connor
2017/0207600 A1 7/2017 Klamkin et al.
2019/0052063 A1 * 2/2019 Tolstikhin ............. H01S 5/4012
2020/0253547 A1 8/2020 Harris et al.
2020/0297955 A1 9/2020 Shouldice
2021/0391691 A1 12/2021 Sugiyama et al.
2022/0059992 A1 2/2022 Hill et al.
2022/0091333 A1 3/2022 Wu
2022/0099896 A1 3/2022 Arbore et al.
2022/0190550 A1 6/2022 Hjartarson et al.
2023/0087712 A1 * 3/2023 Blanchette ........... G02B 17/061 359/731
2023/0103057 A1 3/2023 Wang et al.
2024/0156401 A1 5/2024 Harris et al.

FOREIGN PATENT DOCUMENTS

| | | |
|---|---|---|
| CN | 107769853 | 3/2018 |
| EP | 3561561 | 10/2019 |
| FR | 2949024 | 2/2011 |
| JP | 60127776 | 7/1985 |
| JP | S60127776 | 7/1985 |
| JP | S63177495 | 7/1988 |
| JP | H02219332 | 8/1990 |
| JP | 2000077776 | 3/2000 |
| JP | 2001284702 | 10/2001 |
| JP | 2015138870 | 7/2015 |
| JP | 2016189437 | 11/2016 |
| WO | WO 02/011339 | 2/2002 |
| WO | WO 11/090274 | 7/2011 |

OTHER PUBLICATIONS

Wang et al., “Ultra-broadband and low-loss 3 dB optical power splitter based on adiabatic silicon waveguides” (May 2016) Optics Letters 41(9) 2056-2057.

Gonzalez-Sanchez et al., “Capacitive Sensing for Non-Invasive Breathing and Heart Monitoring in Non-Restrained, Non-Sedated Laboratory Mice,” Sensors 2016, vol. 16, No. 1052, pp. 1-16.

He et al., “Integrated Polarization Compensator for WDM Waveguide Demultiplexers,” *IEEE Photonics Technology Letters* vol. 11, No. 2, Feb. 1999, pp. 224-226.

Kybartas et al., “Capacitive Sensor for Respiratory Monitoring,” Conference “Biomedical Engineering,” Nov. 2015, 6 pages.

* cited by examiner

WAVELENGTH AGILE MULTIPLEXING

CROSS-REFERENCE TO RELATED APPLICATIONS

This application is a continuation of U.S. patent application Ser. No. 17/479,987, filed Sep. 20, 2021, which is a nonprovisional and claims the benefit under 35 U.S.C. § 119(e) of U.S. Provisional Patent Application No. 63/083,507, filed Sep. 25, 2020, the contents of which are incorporated herein by reference as if fully disclosed herein.

FIELD

This disclosure generally relates to an optical system including light emitters, waveguides, and gratings. More particularly, embodiments herein relate to an optical system for multiplexing and/or demultiplexing light emitted by a number of light emitters and controlling the number of light emitters with respect to a desired number of wavelengths to be input to a multiplexer and/or a demultiplexer.

BACKGROUND

Generally, optical systems may employ light to transmit information, such as in spectrographic measurement systems. In order to contain a large amount of information, multiple signals may be emitted from a number of light emitters and may include various wavelengths and/or intensities.

In order to increase the amount of information measured by an optical system, additional light emitters may be added to the optical system. As more light emitters are added, the size of the optical system may increase to the point that the optical system is unwieldy or impossible to use in modern form-factor electronics, such as smart phones, wearable devices, tablet computing devices, laptops, and so on. Increasing a number of light emitters may also lead to energy-inefficient systems and may introduce phase errors into an optical system.

SUMMARY

In some embodiments, a multiplexing system may comprise a multi-wavelength light emitter configured to emit a multi-wavelength light output, a demultiplexer configured to receive the multi-wavelength light output and to split the multi-wavelength light output into a first split light output having a first wavelength and a second split light output having a second wavelength different from the first wavelength, a light emitter configured to emit a single wavelength light output having a third wavelength different from the first wavelength and the second wavelength, and a light combiner configured to combine the first split light output, the second split light output, and the single wavelength light output. The light combiner may comprise a first input channel configured to receive the first split light output, a second input channel configured to receive the second split light output, and a third input channel configured to receive the single wavelength light output.

In some embodiments, the light emitter may be a first light emitter and the single wavelength light output may be a first single wavelength light output. A multiplexing system may further comprise a second single wavelength light emitter configured to emit a second single wavelength light output having a fourth wavelength. The first wavelength, the second wavelength, the third wavelength, and the fourth wavelength may all be different from each other. The light combiner may further comprise a fourth input channel configured to receive the second single wavelength light output and may be further configured to combine the first split light output, the second split light output, the first single wavelength light output, and the second single wavelength light output into a combined light output.

In some embodiments a first wavelength, a second wavelength, a third wavelength, and a fourth wavelength may each be in a short-wave infrared spectrum. A multiplexing system may further comprise a first input waveguide coupled to the demultiplexer and configured to direct the first split light output to the first input channel of the light combiner, a second input waveguide coupled to the demultiplexer and configured to direct the second split light output to the second input channel of the light combiner, and a third input waveguide coupled to the light emitter and configured to direct the single wavelength light output to the third input channel of the light combiner.

In some embodiments, the first input channel, the second input channel, and the third input channel may each be separated by a distance between 3 nm to 15 nm.

In some embodiments, a first wavelength and a second wavelength may be phase shifted by about 180 degrees. A light combiner may be an Echelle multiplexer that combines the first split light output and the second split light output to generate a spectrographic output.

In some embodiments, an optical system may comprise a demultiplexer configured to direct a first split light output into a first waveguide, direct a second split light output into a second waveguide, direct a third split light output into a third waveguide, and direct a fourth split light output into a fourth waveguide, and a multiplexer configured to receive the first split light output via the first waveguide, the second split light output via the second waveguide, the third split light output via the third waveguide, and the fourth split light output via the fourth waveguide.

An optical system may further comprise a first light emitter configured to direct a first light output toward the demultiplexer, the first light output comprising the first split light output and the second split light output, and a second light emitter configured to direct a second light output toward the demultiplexer, the second light output comprising the third split light output and the fourth split light output.

In some embodiments, the first split light output, the second split light output, the third split light output, and the fourth split light output comprise spectroscopically different wavelengths. The first light emitter may operate in a multi-mode state to produce the first light output with multiple wavelengths and the second light emitter may operate in the multi-mode state to produce the second light output with multiple wavelengths.

In some embodiments, a first split light output may have a first wavelength and a second split light output may have a second wavelength different from the first wavelength. The first wavelength and the second wavelength may be different by between about 3 nm and about 15 nm.

A multiplexer may comprise a diffractive grating and each of a first split light output, a second split light output, a third split light output, and a fourth split light output may be directed to a point on the diffractive grating. The diffractive grating may define a Rowland circle and the first waveguide, the second waveguide, the third waveguide, and the fourth waveguide may be disposed along a circumference of the Rowland circle.

An optical system may further comprise an output waveguide of the multiplexer, the output waveguide configured to receive a combined beam of light of the first split light output, the second split light output, the third split light output, and the fourth split light output. The output waveguide may be disposed along the circumference of the Rowland circle. The demultiplexer may be an Echelle demultiplexer.

In some embodiments, a method for multiplexing light may comprise emitting a first light output into a first waveguide, emitting a second light output into a demultiplexer, the demultiplexer configured to split the second light output into a first split light output and a second split light output, receiving the first split light output into a second waveguide, receiving the second split light output into a third waveguide, receiving the first light output, the first split light output, and the second split light output into a multiplexer via the first waveguide, the second waveguide, and the third waveguide, respectively, combining, within the multiplexer, the first light output, the first split light output, and the second split light output into a combined light, and outputting the combined light from the multiplexer and into an output waveguide.

In some embodiments, a first light output may have a first wavelength, a first split light output may have a second wavelength, a second split light output may have a third wavelength, and the first wavelength, the second wavelength, and the third wavelength may be separated by about 3 nm to 15 nm. The second light output may be emitted by a light emitter configured to emit light with multiple wavelengths.

BRIEF DESCRIPTION OF THE DRAWINGS

Reference will now be made to representative embodiments illustrated in the accompanying figures. It should be understood that the following descriptions are not intended to limit the embodiments to one or more preferred embodiments. To the contrary, they are intended to cover alternatives, modifications, and equivalents as may be included within the spirit and scope of the described embodiments as defined by the appended claims. Identical reference numerals have been used, where possible, to designate identical features that are common to the figures.

Figure 1:
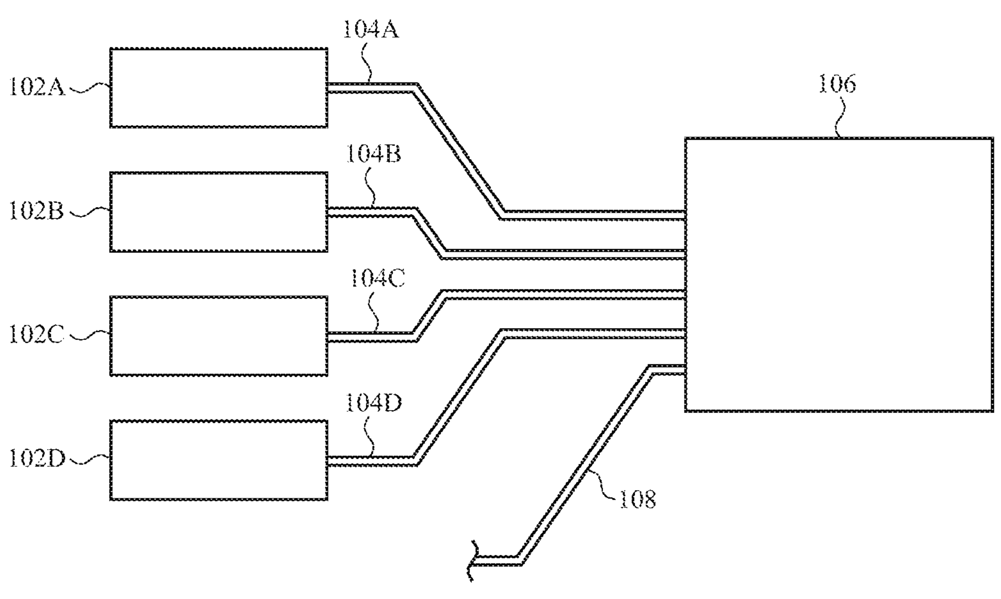
FIG. 1 depicts an example multiplexing system, including a number of light emitters, a number of waveguides, a multiplexer, and an output.

It should be understood that the proportions and dimensions, either relative or absolute, of the various features and elements, and collections and groupings thereof, and the boundaries, separations, and positional relationships presented between them, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

As used herein, the term "about," when used in conjunction with a proposed value, may refer to a value of +/−10% of the given value. For example, the phrase "about 10 nm" may refer to a value at or between 9 nm and 11 nm.

In the following description of example embodiments, reference is made to the accompanying drawings which show, by way of illustration, specific examples that can be practiced. It is to be understood that other examples can be used and structural changes can be made without departing from the scope of the various examples.

The following disclosure relates to systems and apparatuses for multiplexing and/or demultiplexing light. Multiplexing systems may be used to combine a number of light outputs into a single light output for ease of transmission and/or measurement. In optical technologies, wavelength-division multiplexing (WDM) combines a number of different wavelengths of, for example, multiple laser light outputs to create a single light output. Thereafter, the single light output may be transmitted through a waveguide or optical fiber while still containing information indicative of each of the initially combined wavelengths. Though WDM technologies will be primarily discussed herein, principles of the present disclosure may be used with any number of multiplexing technologies, such as frequency-division multiplexing, time-division multiplexing, and so on.

In order to contain a large amount of information within a multiplexed light output, a number of different light emitters may be used to generate a respective light output to be combined within a light combiner. In some embodiments, a light combiner may be a multiplexer. In additional and/or alternative embodiments, a light combiner may be a curved surface or any other element or combination of elements configured to combine multiple light inputs into a single light output.

In some embodiments, each of a set of light emitters may be used to generate a light output, where each light output corresponding to each light emitter has a unique wavelength. Each light output may then be directed toward a light combiner where the light outputs are combined into a single light output. A light combiner, such as a multiplexer, may include a diffraction grating including reflective portions (e.g., grooves) disposed at a number of different and/or the same angles and/or positions. By accurately and precisely directing the individual light outputs of a known wavelength to a specific output location on the light combiner, the multiple light outputs may be formed into a single light output (e.g., a combined light output) at the output location. This output location may be a location where each of the light outputs are combined into the single light output. Thereafter, the combined light output may be transmitted as an output via a waveguide provided at or near the output location.

To increase a sensitivity or informational value of a multiplexed light output (e.g., a combined light output), an increased number of light emitters may be provided. That is, a system with five light emitters may result in a combined light output that holds more information and/or has a better signal-to-noise ratio than a system with two light emitters, due to an increased number of wavelengths present in the combined light output. However, a system with a large number of light emitters may suffer from energy, complexity, cost, and/or size constraints.

As mentioned above, the ability to increase the number of wavelengths emitted by a system without increasing the number of light emitters may be beneficial for many spectroscopic applications. When multiple wavelengths are emitted by a single light emitter, it may be possible to combine these wavelengths with minimal losses if they are close to one another in wavelength. On the other hand, in order to not be duplicative (e.g., from a spectroscopic standpoint), two wavelengths should have some minimum spacing. While the exact spacing between two wavelengths is dependent on the overall system and attribute the system measures, for the purpose of this description, two wavelengths are considered "spectroscopically unique" if the wavelengths are at least about 3 nanometers (nm) to 15 nanometers (nm) apart. In order to obtain a multiplexed light output, incoming light outputs may be carefully directed to certain input locations (e.g., channels) of a light combiner. For example, a first light output with a first wavelength may be directed to a first channel, a second light output with a second wavelength may be directed to a second channel, and so on. In some embodiments, each channel of a light combiner may be designed or configured to receive a light output having a predetermined wavelength. In some embodiments, each channel of a light combiner may receive multiple wavelengths, but may direct only one such wavelength to an output location, with the other wavelengths being filtered and/or scattered.

In the present disclosure, a single light emitter, which, in some embodiments, may be a laser, may be configured to emit a light output comprising multiple different wavelengths. In this way, a single light emitter may be used instead of multiple different light emitters, which may result in energy, complexity, cost, and/or size savings. However, as described above, each channel of a light combiner may be configured to receive a light output having a particular wavelength or, in some embodiments, may receive one wavelength per channel. It may be understood that the term "multi-wavelength light emitter" as used herein describes a light source that is configured to emit multiple different wavelengths of light and the term "light emitter" as used herein generally describes a light source that is configured to either emit a single wavelength of light or in other examples, multiple different wavelengths of light.

In some embodiments, a light emitter configured to emit multiple wavelengths of light as a multi-wavelength light output may be provided with a demultiplexer to separate the multi-wavelength light output into multiple split light outputs, each split light output having unique wavelengths. In some embodiments, the term "split light output" may encompass light outputs having fewer wavelengths than the multi-wavelength light output input to the demultiplexer. For example, a split light output may comprise half the number of wavelengths present in the multi-wavelength light output and/or may comprise one wavelength.

In some embodiments, multiple waveguides may be provided at an output of the demultiplexer to direct each split light output to a particular channel associated with a particular wavelength. In some embodiments, a multiplexing system may comprise multiple demultiplexers. In some embodiments, a demultiplexer may separate a multi-wavelength light output into two split light outputs (e.g., a first split light output and a second split light output), where each split light output has a unique wavelength or unique wavelengths. Though two split light outputs are described, any number of split light outputs may be created or redirected from a multi-wavelength light output. In this way, a high signal-to-noise ratio may be achieved without providing a high number of light emitters.

Some embodiments described herein may use an optical, two-channel demultiplexer configured to separate light into two components (e.g., two split light outputs). A two-channel demultiplexer may be configured to separate multiple-wavelength inputs (e.g., light) transmitted to an input of the two-channel demultiplexer (e.g., as emitted by a light emitter). In this way, the two-channel demultiplexer may losslessly route two wavelengths of the multiple-wavelength inputs to two output ports of the two-channel demultiplexer. In this way, two split light components, each comprising one of the two wavelengths, may be created. Though discussed as a two-channel demultiplexer, any number of channels may be used in accordance with the provided disclosure. For example, a three-channel demultiplexer may separate a multiple-wavelength input into three split light outputs, a four-channel demultiplexer may separate a multiple-wavelength input into four split light outputs, and so on.

Any type of optical demultiplexer may be used in accordance with the provided disclosure. For example, a multi-mode interference coupler (e.g., a multi-mode interferometer (MMI)) may be used as an optical demultiplexer. A multi-mode interference coupler may comprise a micro-scale structure configured to receive light waves. The micro-scale structure may guide light in a predictable way so as to split or otherwise separate an input light into multiple light outputs. In another example, a Mach-Zehnder interferometer (MZI) may be used as an optical demultiplexer. A MZI may use a number of reflective surfaces (e.g., a mirror) and a number of beam splitters to separate light into different components. Though two optical demultiplexers are described, any kind of optical demultiplexer may be used in accordance with the provided disclosure. Any used optical demultiplexer may be optimized, or otherwise configured, for predetermined wavelengths. As such, the wavelengths of a multi-wavelength light output, as emitted by a light emitter, may be known due to properties of the light emitter.

As described herein, a light emitter may be a laser and, in some embodiments, may be a multi-mode distributed feedback (DFB) laser. A multi-mode DFB laser may be capable of accessing at least two spectroscopically unique wavelengths. In some embodiments, the term "spectroscopically unique" may refer to wavelengths at least about 3 nanometers (nm) to 15 nanometers (nm) apart. In some embodiments, any type of light emitter may be used, including a tunable laser, a halogen lamp, a ruby laser, a light-emitting diode (LED), and so on. In some embodiments, a light emitter may comprise one spectroscopically unique wavelength.

Generally, such embodiments may take the form of a photonic integrated circuit or other integrated optical circuits. These and other embodiments are discussed below with reference to FIGS. 1-6. However, those skilled in the art will readily appreciate that the detailed description given herein with respect to these Figures is for explanatory purposes only and should not be construed as limiting.

FIG. 1 depicts an example multiplexing system 100 including a number of light emitters 102A-102D (e.g., a first light emitter 102A, a second light emitter 102B, a third light emitter 102C, and a fourth light emitter 102D), a number of input waveguides 104A-104D (e.g., a first input waveguide 104A, a second input waveguide 104B, a third input waveguide 104C, and a fourth input waveguide 104D), a light combiner 106, and an output waveguide 108. In some embodiments, the light combiner 106 may be an Echelle multiplexer, though other light combiners may be used in accordance with the provided disclosure.

The light emitters 102A-102D may each generate light outputs with spectroscopically unique wavelengths. For example, the first light emitter 102A may generate a first light output with a wavelength of approximately 1,500 nanometers (nm), the second light emitter 102B may generate a second light output with a wavelength of approximately 1,600 nm, and so on. Here it is noted that the provided wavelengths are merely exemplary and any wavelength emitted by a light emitter may be used in accordance with the provided disclosure. For example, any wavelengths in the short-wave infrared (SWIR), ultraviolet, infrared, or visible ranges may be used.

As previously mentioned, the spectroscopically unique wavelengths may result in a combined light output from the light combiner 106 having a greater amount of optical information. As used in, for example, spectroscopy, different materials may react differently to different wavelengths of light. Precise measurements with respect to many spectroscopically different wavelengths may serve to identify a known or unknown material. By increasing the number of spectroscopically unique wavelengths input to a multiplexer, a definition and/or clarity of a spectrographic measurement may be increased.

In some embodiments, the wavelengths of the light generated by the light emitters 102A-102D may be in the short-wave infrared (SWIR) range of wavelengths. In some embodiments, the light emitters 102A-102D may emit light outputs with wavelengths separated by an increment of at least between about 3 nm to about 15 nm. In some embodiments, a wavelength separation may be higher (e.g., on an order of magnitude of 100 nm). The wavelength separation may correspond to spectroscopically unique wavelengths with reference to the light combiner 106 (e.g., to route wavelengths to channels on the light combiner 106 losslessly). A minimum and maximum wavelength separation may correspond to capabilities of the light combiner 106 and is not particularly limited.

In some examples, the light emitters may be any light source such as distributed feedback (DFB) lasers, tunable light sources, lasers, tunable lasers, laser diodes, light-emitting diodes (LEDs), any coherent or semi-coherent light source, a collimated light source, any combination thereof and so forth. Additionally, although four light emitters 102A-102D are depicted in FIG. 1, any number or type of light sources may be employed in the multiplexing system 100.

As depicted in FIG. 1, each light emitter 102A-102D may be associated with a respective input waveguide 104A-104D. The input waveguides 104A-104D may take the form of any photonics waveguide configured to guide an electromagnetic wave (e.g., strip waveguides, slab waveguides, a fiber optic cable, photonic-crystal fiber, hollow waveguides, and so on). In some embodiments, the input waveguides 104A-104D may be provided on a photonics chip and/or microchip.

The input waveguides 104A-104D may direct the light emitted from each light emitter 102A-102D to respective channels of a light combiner 106. In some embodiments, the channels of the light combiner 106 may be separated by an equal distance. For example, each channel may be separated from adjacent channels by between 2 nm to 100 nm or by about 3 nm to 15 nm. More generally, any channel spacing capable of being utilized in Coarse Wavelength Division Multiplexing (CWDM), Dense Wavelength Division Multiplexing (DWDM), or any other form of WDM may be used. In some embodiments, the separation between channels on the light combiner 106 may correspond to a difference between successive wavelengths emitted by each light emitter 102A-102D. For example, where channels on the light combiner 106 are between about 3 nm to 15 nm apart, the difference between, as a non-limiting example, a first wavelength emitted by the light emitter 102A and a second wavelength emitted by the light emitter 102B may be between about 3 nm to 15 nm. This may correspond to spectroscopically unique wavelengths with respect to capabilities of the light combiner 106 and is not particularly limited.

Once light is emitted from the light emitters 102A-102D, the input waveguides 104A-104D may direct the respective light outputs into channels of the light combiner 106. As described herein, a light combiner 106 may have any number of configurations related to, but not limited to, channel spacing distances, diffractive grating properties, number of input channels, number of output channels, and so on. An example light combiner (e.g., an Echelle multiplexer) is described in additional detail with respect to FIG. 2. Some embodiments may use a type of multiplexer or process of multiplexing different from an Echelle multiplexer. Accordingly, some embodiments may use any light combiner, multiplexer, or multiplexing process to combine a number of light outputs into a combined light output, in accordance with the provided disclosure.

The light combiner 106 may include a diffractive grating that facilitates combining the light emitted from the light emitters 102A-102D into a combined output. Input light reflect from the diffractive grating and exit the light combiner 106 via an output waveguide 108. The output waveguide 108 may be substantially similar in structure to the input waveguides 104A-104D and may direct the combined light output to any of a number of electrical structures or elements for transmission and/or analysis. In some embodiments, the output waveguide 108 may direct the combined output to, for example, a spectrographic device where a spectroscopic analysis may be performed.

Generally, each of the input waveguides 104A-104D may be optically or physically coupled with a respective light emitter 102A-102D. The precise manner of coupling may take many forms, including by: mechanical coupling (e.g., an adhesive or fastener); optical coupling (e.g., by a lens); directional coupling (e.g., each light emitter is positioned to direct light into the respective waveguide); and so on.

Figure 2:
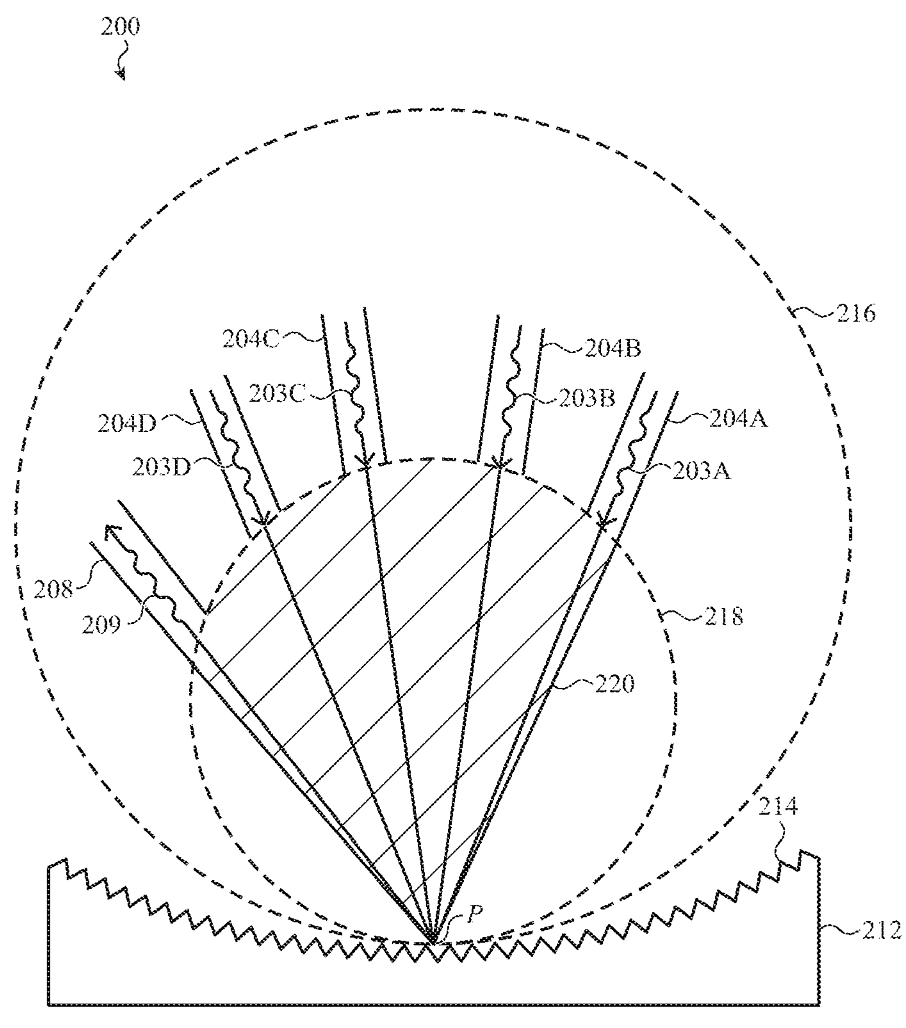
FIG. 2 illustrates a diagram of an example multiplexer implement including an Echelle grating.

FIG. 2 illustrates an example multiplexer 200 having a diffraction grating 212. In some embodiments, the multiplexer 200 may be the same as the light combiner 106 described with respect to FIG. 1. The multiplexer depicted in FIG. 2 may be an Echelle multiplexer, though other types of multiplexers may be used in embodiments consistent with the provided disclosure. In some embodiments, the multiplexer 200 may be substantially similar to the Echelle multiplexer 106 as depicted in FIG. 1. The multiplexer 200 may include a number of input waveguides 204A-204D, an output waveguide 208, a diffraction grating 212, and a slab waveguide 220. In some examples, the diffraction grating 212 may be a tunable Echelle grating and may comprise reflective facets 214. The diffraction grating 212 may have a radius of curvature that is associated with an imaginary diffraction grating circle 216 and/or a "Rowland circle" 218.

A Rowland circle 218 may be used to determine where components of the multiplexer 200 are placed such as, for example, ends of the input waveguides 204A-204D, an end of the output waveguide 208, a diffraction grating 212, and so on. If at least these components are at least partially placed along a circumference of the Rowland circle 218, the input light 203A-203D may combine into an output light 209 after the diffraction grating 212 reflects the input light 203A-203D, as determined by angles and positions of the reflective facets 214. The Rowland circle 218 may be about half the size of the diffraction grating circle 216 and may define the locations of the input waveguides 204A-204D, the output waveguide 208, and a point P on which the input light 203A-203D converges on the diffraction grating 212. In some embodiments, the Rowland circle 218 may be tangential to the diffraction grating 212 at the diffraction grating's 212 midpoint.

The input waveguides 204A-204D may emit input light 203A-203D into channels of the multiplexer 200. As described with respect to FIG. 1, channels of the multiplexer 200 may be configured to receive a particular wavelength of light. After being received by channels, the input light 203A-203D may be directed into a slab waveguide 220 positioned within a cavity of the multiplexer 200. The slab waveguide 220 may direct the input light 203A-203D to point P on the diffraction grating 212 and may direct the output light 209 toward the output waveguide 208 after reflecting from the diffraction grating 212. The slab waveguide 220 may further be optically coupled to the diffraction grating 212, so that the slab waveguide 220 may direct the input and output light and to reduce the potential loss of light.

In some embodiments, the area outside of the slab waveguide 220 may be a doped material to prevent the attenuation of input and output light. Additionally or alternatively, the slab waveguide 220 may include a core or propagation region, with cladding layers on both sides of the propagation region. The slab waveguide 220 may be in the form of any kind of waveguide including, but not limited to: ceramic waveguides; metallic waveguides; waveguides on a photonic chip; and so on.

As further depicted in FIG. 2, reflective facets 214 may be provided on a surface of the diffraction grating 212. The precise shape and size of the reflective facets 214 is not necessarily to scale in FIG. 2 and any shape and size may be used in accordance with principles of an Echelle multiplexer. Additionally, although the reflective facets 214 are illustrated across an entire surface of the diffraction grating 212, the diffraction grating 212 may include any appropriate number of reflective facets 214 at any location or number of locations. Each of the reflective facets 214 may be approximately equidistant from one another or may be spaced at different distances.

The reflective facets 214 of the diffraction grating 212 may determine the angle at which the input light 203A-203D reflects off of the diffraction grating 212, in combination with the radius of curvature of the diffraction grating 212, as depicted by the diffraction grating circle 216. For example, when the input light 203A-203D reflects off of the diffraction grating 212, light may reflect in a different direction and/or at a different angle from the diffraction grating 212, due to the reflective facets 214 and depending on a wavelength and/or emission location of each individual input light. Due to these different directions and angles, the input light 203A-203D may converge as an output light 209. In this way, input light emitted from different locations may converge at the same location after reflection from the respective reflective facets of the diffraction grating 212. An end of the output waveguide 208 may be positioned on the Rowland circle 218 to receive the output light 209.

As shown in FIG. 2, the four depicted input waveguides 204A-204D and the output waveguide 208 are used for explanatory purposes only and the multiplexer 200 may utilize one or more input waveguides and one or more output waveguides as appropriate. Additionally, the distance between the input and output waveguides with respect to each other may be between about 3 nm to 15 nm apart or may be any other distance apart as may be determined using optical principles. In some embodiments, the distance between the input and output waveguides may correspond to a difference between wavelengths of input light 203A-203D. For example, if the distance between the input and output waveguides is between about 3 nm to 15 nm apart, then the difference between wavelengths of input light 203A-203D may also be about 3 nm to 15 nm apart.

In some examples, the input light 203A-203D may have multiple wavelengths of light in a short wave infrared (SWIR) wavelength range of light of approximately 0.7 microns (μm)-5.0 μm and the output light 209 may be a combination of different wavelengths of light in the same range. In additional or alternative embodiments, the wavelengths of the input light 203A-203D may be spaced at least between 3 nm to 15 nm apart or may have any wavelength value along the electromagnetic spectrum, including in the infrared, ultraviolet, and visible ranges. As discussed above, the difference between the wavelengths of the input light 203A-203D may correspond to a distance between channels of the multiplexer 200, as defined by input and/or output waveguides.

In some embodiments, the input and/or output waveguides may be any waveguide configured to guide an electromagnetic wave (e.g., strip waveguides, slab waveguides, a fiber optic cable, photonic-crystal fiber, hollow waveguides, and so on). In some embodiments, the waveguides may be provided on (or as part of) a photonics or integrated circuit.

Though not depicted in FIG. 2, it may be understood that light emitters not illustrated in FIG. 2 may provide input light 203A-203D to the input waveguides 204A-204D. Similarly, the output waveguide 208 may provide the output light 209 to one or more light detectors and/or spectrographic devices. The detectors and/or spectrographic devices may include any type of photodetector that can respond to or measure photons impinging on its active area. The detectors may generate one or more detector signals indicative of the output light 209 (e.g., as a spectroscopic graph as shown in, for example, FIG. 6).

In FIG. 2, for explanatory purposes only, the input waveguides 204A-204D are located at respective positions on one side of the multiplexer 200 and the output waveguide 208 is located at an end of the input waveguides 204A-204D without separating any of the input waveguides 204A-204D. However, in additional or alternative embodiments, the input and output waveguides may be arranged in different configurations. For example, input waveguides may be located on either side of the output waveguide, there may be two output waveguides that may be located on either side of an input waveguide, and so on.

As mentioned above, the illustrated multiplexer 200 may be configured to multiplex input light. In other configurations, the diffraction grating 212 may be configured to demultiplex an input light into multiple light outputs. In such configurations, an input light may be inputted from a single input waveguide, the input light may be demultiplexed by the diffraction grating 212, and the input light may then be outputted as output light at multiple output waveguides.

Figure 3:
FIG. 3 depicts an example multiplexing system, including a number of light emitters, a demultiplexer configured to demultiplex a multi-wavelength light output emitted from one of the number of light emitters, and a multiplexer configured to combine light.
Figure 3:
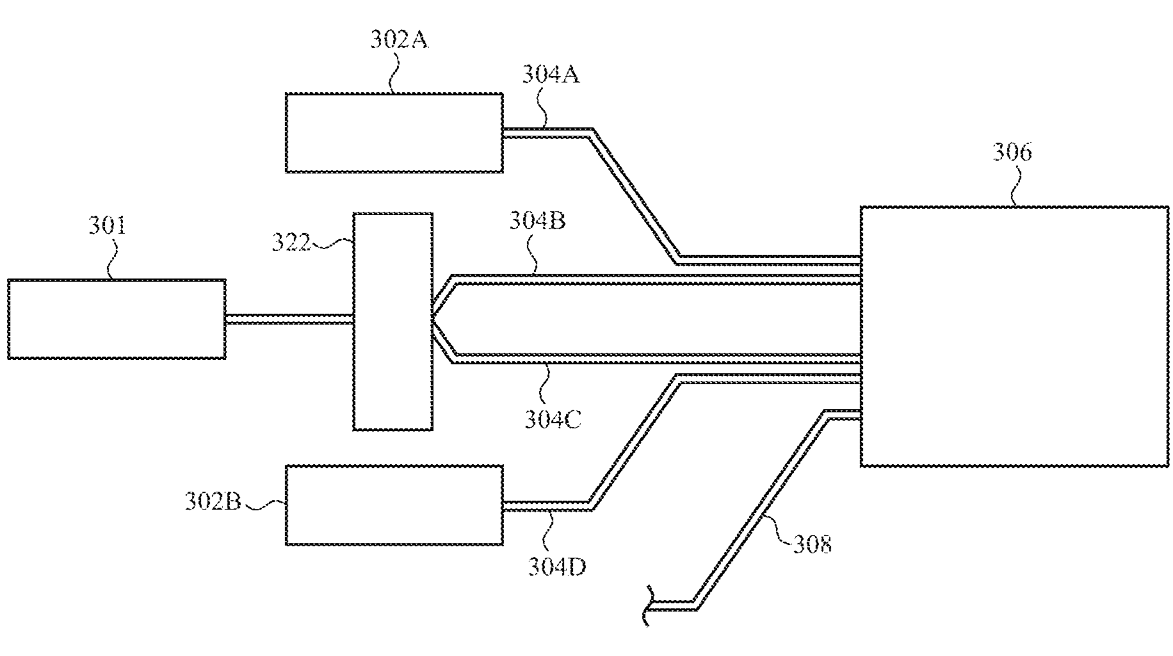

FIG. 3 depicts an example multiplexing system 300 in accordance with an embodiment. In the multiplexing system 300, a multi-wavelength light emitter 301 may be configured to output light to a demultiplexer 322. In additional or alternative embodiments, the demultiplexer 322 may function as an optical splitter. The embodiment depicted in FIG. 3 may use the multiplexer depicted and described with respect to FIG. 2 and may include similar features as described with respect to FIG. 1.

The multi-wavelength light emitter 301 may be a distributed feedback (DFB) laser and may be configured to emit at least two unique wavelengths concurrently or successively. In some embodiments, the two unique wavelengths may be from about 3 nm to 15 nm apart. The two unique wavelengths may be generated due to multiple spatial modes of the multi-wavelength light emitter 301 and/or by emitted light of the multi-wavelength light emitter 301 diverging more than an associated diffraction limit. The discussed wavelength difference is merely provided for explanatory purposes and any wavelength separation may be used in accordance with the disclosure. It should be appreciated that the use of the terms such as "multi-wavelength light," or "multi-wavelength light output," or "multi-wavelength light emitter," and so forth, that this need not require that the output light include multiple wavelengths simultaneously. Instead, these light outputs only indicate the ability to output multiple wavelengths of light (whether simultaneously or time-multiplexed). In instances where an output does output multiple wavelengths simultaneously, the application will specify this using the terms "simultaneous" or "simultaneously." Similarly, when a demultiplexer is described herein as splitting light of multiple wavelengths, it should be appreciated that these demultiplexers only need to be capable of splitting light of multiple wavelengths, but need not receive these wavelengths simultaneously. For example, if the demultiplexer splits multi-wavelength light into a first output having a first wavelength and a second output having a second wavelength, the demultiplexer will only output light to the first output to the extent that the first wavelength is present in the received multi-wavelength light at that time.

The multi-wavelength light emitter 301 may additionally be configured to operate time-sequentially at the two or more unique wavelengths that are emitted by the multi-wavelength light emitter 301. In some embodiments, a tunable laser may be used to provide laser light with multiple wavelengths. In accordance with the present disclosure, any light emitter capable of providing light in multiple wavelengths may be provided.

The demultiplexer 322 may be a one-by-two demultiplexer and may be selected to separate at least two wavelengths of light emitted by the multi-wavelength light emitter 301. The demultiplexer 322 may route the two wavelengths emitted by the multi-wavelength light emitter 301 to different output ports of the demultiplexer 322 based on wavelength values of light emitted by the multi-wavelength light emitter 301. In this way, the demultiplexer may split the light emitted by the multi-wavelength light emitter 301 into two split light outputs, each having spectroscopically different wavelengths. For example, a first split light output may have a first wavelength and a second split light output may have a second wavelength different than the first wavelength. The two split light outputs may be described as outputs of the demultiplexer 322 and may be connected to two input waveguides connecting the demultiplexer 322 with a multiplexer 306. The two input waveguides are depicted in FIG. 3 as a second waveguide 304B and a third waveguide 304C.

In some embodiments, the demultiplexer 322 may be implemented using, for example, a multi-mode interference coupler, a Mach-Zehnder interferometer optimized for the two wavelengths emitted by the multi-wavelength light emitter 301, and so on. The demultiplexer 322 may have sinusoidal transmission spectra and the output ports of the demultiplexer 322 may be phased from between 1 degree and 359 degrees apart. To prevent potential overlap between the output ports, in some embodiments the output ports may be phased from between 90 degrees and 270 degrees or by 180 degrees apart. The phase difference between output ports on the demultiplexer 322 may correspond to a phase difference between wavelengths in a multi-wavelength light input to the demultiplexer as shown in, for example, FIGS. 5A and 5B.

As depicted in FIG. 3, a multiplexing system 300 may additionally include a first mono-modal light emitter 302A and a second mono-modal light emitter 302B, along with associated input waveguides 304A and 304B. Each of these light emitters may be substantially mono-modal and may be configured to emit light substantially comprising a single wavelength. For example, the first mono-modal light emitter 302A may emit light of a third wavelength and the second mono-modal light emitter 302B may emit light of a fourth wavelength, where the third and fourth wavelengths are different from each other and are different from the first wavelength and the second wavelength emitted by the multi-wavelength light emitter 301. Though described as mono-modal light emitters, in some embodiments the light emitters 302A and 302B may emit light comprising multiple wavelengths. Such wavelengths may be sufficiently close such that the wavelengths are treated equivalently or are otherwise prevented from entering the multiplexer 306 due to provided optical elements such as a filter.

As previously mentioned, the spectroscopically unique wavelengths may result in a combined light output from the multiplexer having a greater amount of optical information. As used in, for example, spectroscopy, different materials may react differently to different wavelengths of light. Precise measurements at many spectroscopically different wavelengths may serve to identify a known or unknown material. By increasing the number of spectroscopically unique wavelengths input to a multiplexer, a definition and/or clarity of a spectrographic measurement may be increased.

In some embodiments, the light traveling along the waveguides 304A-304D may be separated by about 3 nm to 15 nm and may correspond to channels of the Echelle multiplexer 306 that are separated by about 3 nm to 15 nm.

Each of the input waveguides 304A-304D may be optically or physically coupled with a respective light emitter 302A-302B and/or a demultiplexer 322. The precise manner of coupling may take many forms including by: mechanical means (e.g., an adhesive or fastener); optical means (e.g., by a lens); directional means (e.g., each light emitter is positioned to direct light into the respective waveguide); and so on.

In some embodiments, the demultiplexer 322 may yield lossless separation of two combined wavelengths as in a multi-wavelength light input. As used herein, "lossless" may refer to extrinsic losslessness which generally arises from an arrangement of an optical system. Intrinsic losslessness refers to loss due to elemental properties of the particular material used and may be inherent, to some degree, in potential systems as described herein. Accordingly, the word "lossless" or the term "lossless separation" may refer to the elimination of extrinsic losslessness and not to the complete elimination of intrinsic losslessness, though intrinsic loss may be reduced to some degree.

As described above, the multiplexing system 300 may have the benefit of reducing the number of light emitters while still providing an identical number of light inputs to a multiplexer. For example, the system in FIG. 1 may require four light emitters to produce four light inputs while the system in FIG. 3 may require three light emitters to produce four light inputs. As such, the system of FIG. 3 has a reduced cost, complexity, spatial requirements, and/or power consumption as compared to the system of FIG. 1. The potential benefits of FIG. 3 are not intended to indicate any preference of the multiplexing system 300 over any other described multiplexing system (e.g., the multiplexing system in FIG. 1). Numbered components in FIG. 3 may otherwise be substantially similar to those described in the system of FIGS. 1 and 2. As such, duplicative descriptions, including descriptions related to the output waveguide 308 and the multiplexer 306, have been omitted here.

Figure 4:
FIG. 4 depicts an example multiplexing system, including a number of light emitters, a number of demultiplexers assigned to each of the number of light emitters, and a multiplexer configured to combine a number of light inputs.
Figure 4:
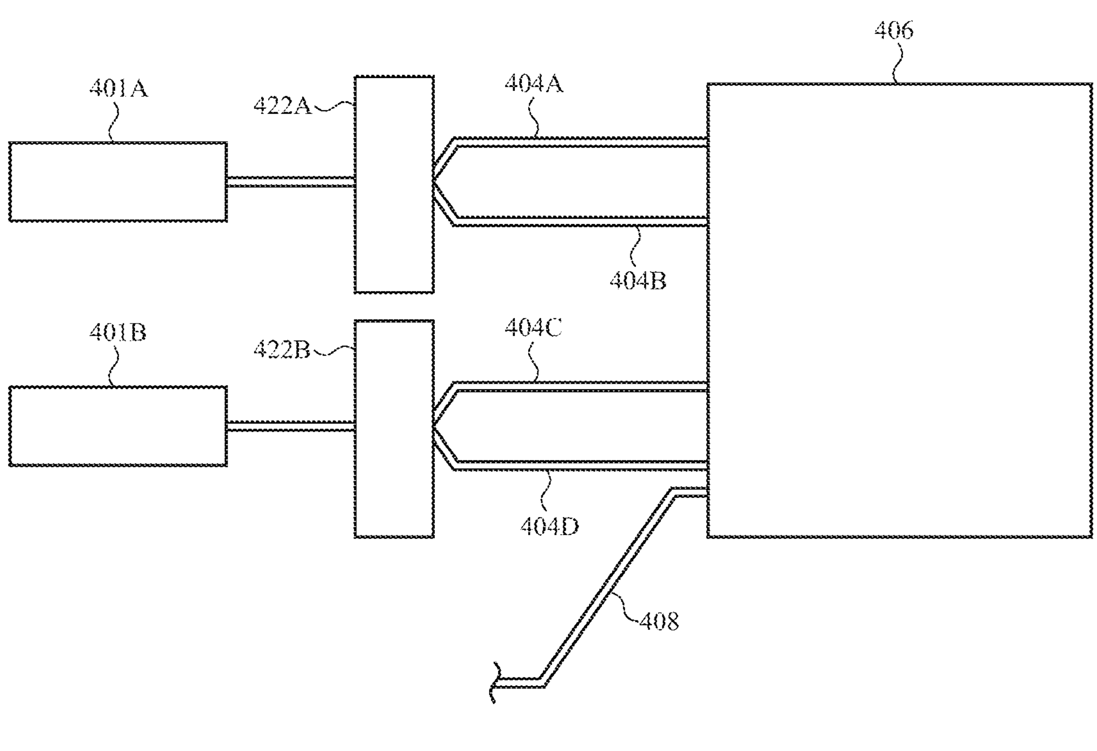

FIG. 4 depicts an additional system where an even fewer number of light emitters (e.g., a first multi-wavelength light emitter 401A and a second multi-wavelength light emitter 401B), with respect to FIG. 3, may be provided in a multiplexing system 400. As discussed with reference to FIG. 3, a reduced number of light emitters may have certain benefits such as reducing the cost, complexity, spatial requirements, and/or power consumption of a multiplexing system. The potential benefits of FIG. 4 are not intended to indicate any preference of the multiplexing system 400 over any other described multiplexing system (e.g., the multiplexing systems in FIG. 1 and FIG. 3).

In the multiplexing system 400, a first demultiplexer 422A may be positioned at an output of the first multi-wavelength light emitter 401A and a second demultiplexer 422B may be positioned at an output of the second multi-wavelength light emitter 401B. As discussed with reference to FIG. 3, the first and second demultiplexers may each be a one-by-two demultiplexer, or optical splitter, that is configured to split light emit from the first and the second multi-wavelength light emitters.

The first multi-wavelength light emitter 401A may emit a first light output toward the first demultiplexer 422A and the second multi-wavelength light emitter 401B may emit a second light output toward the second demultiplexer 422B. The first demultiplexer 422A may split the first light output into a first split light output and a second split light output. Typically, the first split light output and the second split light output have spectroscopically unique wavelengths, with respect to the multiplexer 406. The first demultiplexer 422A may further direct the first split light output into the first input waveguide 404A and may direct the second split light output into the second input waveguide 404B. The first and the second input waveguides 404A and 404B may then direct the first and the second split light outputs into the multiplexer 406 to undergo a multiplexing operation.

As previously mentioned, the spectroscopically unique wavelengths may result in a combined light output from the multiplexer having a greater amount of optical information. As used in, for example, spectroscopy, different materials may react differently to different wavelengths of light. Precise measurements at many spectroscopically different wavelengths may serve to identify a known or unknown material. By increasing the number of spectroscopically unique wavelengths input to a multiplexer, a definition and/or clarity of a spectrographic measurement may be increased.

Similarly, the second demultiplexer 422B may split the second light output into a third split light output and a fourth split light output. The second demultiplexer 422B may further direct the third split light output into the third input waveguide 404C and may direct the fourth split light output into the fourth input waveguide 404D. The third and the fourth input waveguides 404C and 404D may then direct the third and the fourth split light outputs into the multiplexer 406. The third split light output and the fourth split light output may have unique spectroscopically different wavelengths with respect to each other and with respect to the first split light output and the second split light output. Each of the four split light outputs may be combined within the multiplexer 406 to create a combined, multiplexed light output, as discussed herein, and may be output as a combined output light to output waveguide 408.

As mentioned, each of the four split light outputs may have a different wavelength. That is, the first split light output may have a first wavelength, the second split light output may have a second wavelength, the third split light output may have a third wavelength, and the fourth split light output may have a fourth wavelength. In some embodiments, the light traveling along the waveguides 404A-404D may have wavelengths separated by about 3 nm to 15 nm and may correspond to channels of the multiplexer 406 that are separated by about 3 nm to 15 nm.

The remaining structures in the multiplexing system 400 may operate in a manner similar to that discussed in reference to FIGS. 1-3. For example, the input waveguides 404A-404D may direct light to channels of a multiplexer 406 which may combine the light into a combined (e.g., multiplexed) light output. The combined light output may exit the multiplexer 406 through an output waveguide 408. Additional features of the multiplexing system 400 may exist as discussed with respect to equivalent features in FIGS. 1-3.

In accordance with principles of the present disclosure, any number of optical systems may be provided to demultiplex initially emitted light before the demultiplexed light is input to a multiplexer. For example, a multi-wavelength light emitter may emit light of more than two wavelengths. Thereafter, a demultiplexer may split the light and may output the split light into more than two input waveguides. In some embodiments, more than one demultiplexer may be associated with a single light emitter. For example, a light emitter may direct a beam of light to a first demultiplexer. The first demultiplexer may split the beam of light into two split light outputs and may then direct each of the two split light outputs to a second and a third demultiplexer, respectively. In this way, stacks of demultiplexers may be configured to separate initially emitted light into any number of split light outputs, in accordance with wavelengths thereof.

Further, in some embodiments, more than two demultiplexers may be provided in a multiplexing, or demultiplexing, system.

As depicted with respect to FIGS. 3 and 4, a multiplexing system may combine light emitters that emit light with only one wavelength (e.g., a light emitter without an associated demultiplexer) with light emitters that emit light with multiple wavelengths (e.g., a light emitter with one or more associated demultiplexers). In this way, one or more than one wavelength may be associated with any particular unique light emitter.

Figure 5A:
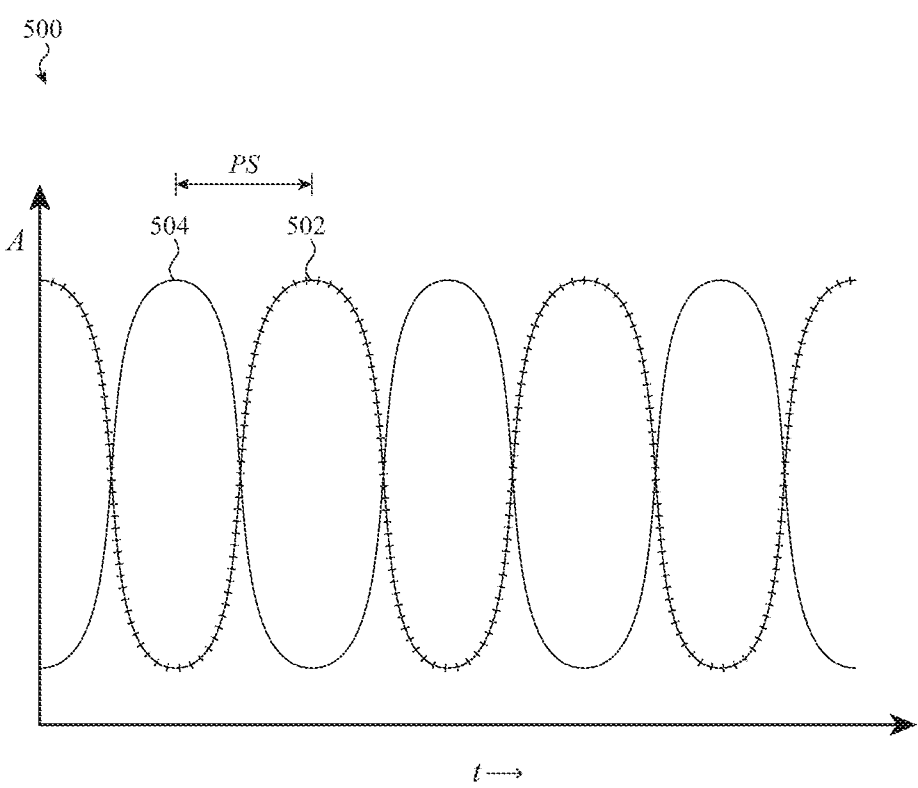
FIG. 5A illustrates an example optical output of a light emitter.
Figure 5B:
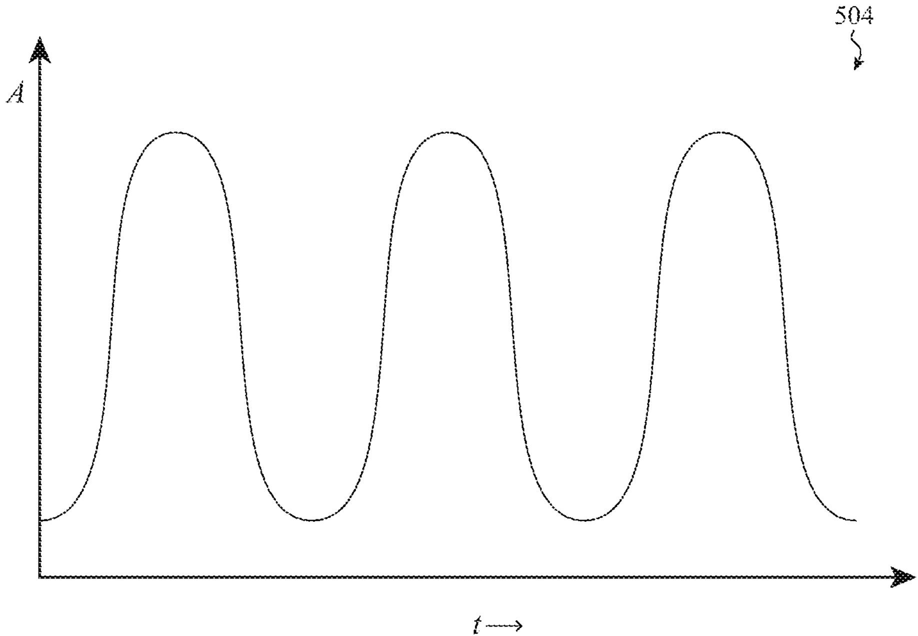
FIG. 5B illustrates an example optical output of a light emitter after the optical output has passed through a demultiplexer.
Figure 5B:
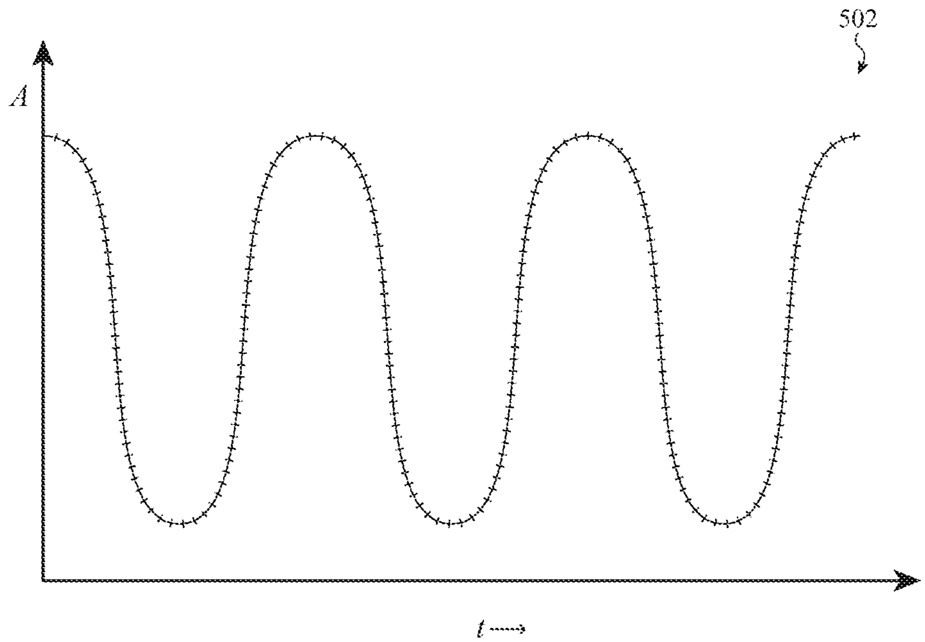

FIGS. 5A and 5B illustrate an example graphical depiction of light comprising multiple wavelengths as emitted from a multi-wavelength light emitter, as in FIG. 5A, and two separated split light outputs after passing through a demultiplexer, as in FIG. 5B.

FIG. 5A depicts a possible output 500 of a multi-wavelength light emitter as described above with respect to multi-wavelength light emitters described in FIGS. 3 and 4. As depicted in FIG. 5A, a first light output may have a first wavelength 502 and a second light output may have a second wavelength 504. The first wavelength 502 and the second wavelength 504 may have a relative phase shift PS of approximately 180 degrees, may have a substantially equivalent amplitude, and may be substantially sinusoidal. This combined waveform may be emitted from a single, multi-wavelength light emitter as discussed with reference to FIGS. 3 and 4. The illustrated output 500 may be a waveform emitted by a multi-wavelength light emitter before entering a demultiplexer.

FIG. 5B depicts two split light outputs after the multi-wavelength light, of, for example, FIG. 5A, is separated by a demultiplexer. For example, a demultiplexer may include a micro-structure configured to direct light having a first wavelength to a first location and to direct light having a second wavelength to a second location. As discussed above with reference to FIGS. 3 and 4, the first split light output with a first wavelength 502 may be directed into a first input waveguide and the second split light output with a second wavelength 504 may be directed into a second input waveguide. This demultiplexing operation may be performed due to the difference in phase and/or wavelength of the two split light output, as determined at a point where the multi-wavelength light shown in FIG. 5A meets a demultiplexer. The first wavelength 502 and the second wavelength 504 may be inputted to a multiplexer via waveguides, as described with reference to FIGS. 3 and 4.

It is noted that the embodiments depicted in FIGS. 5A and 5B are merely exemplary and any phase shift, amplitude, wavelength, and so on may be used in accordance with the present disclosure. For example, though the wavelengths in FIGS. 5A and 5B are depicted as substantially equal, it should be appreciated that this is solely for the sake of the graphical depiction. In some embodiments, the wavelengths differ in some respect such as, for example, by between 3 nm and 15 nm or by any other length. Further, it is noted that in some embodiments, the phase shift may differ depending on a measurement distance from the light emitter. However, as the distance between the light emitter and the demultiplexer may be fixed, the phase shift may be accurately measured at a time when light reaches a demultiplexer. In some embodiments, the amplitudes of the waveforms may differ. In some embodiments, a waveform may include more than two wavelengths, such as three, four, five, and so on.

Figure 6:
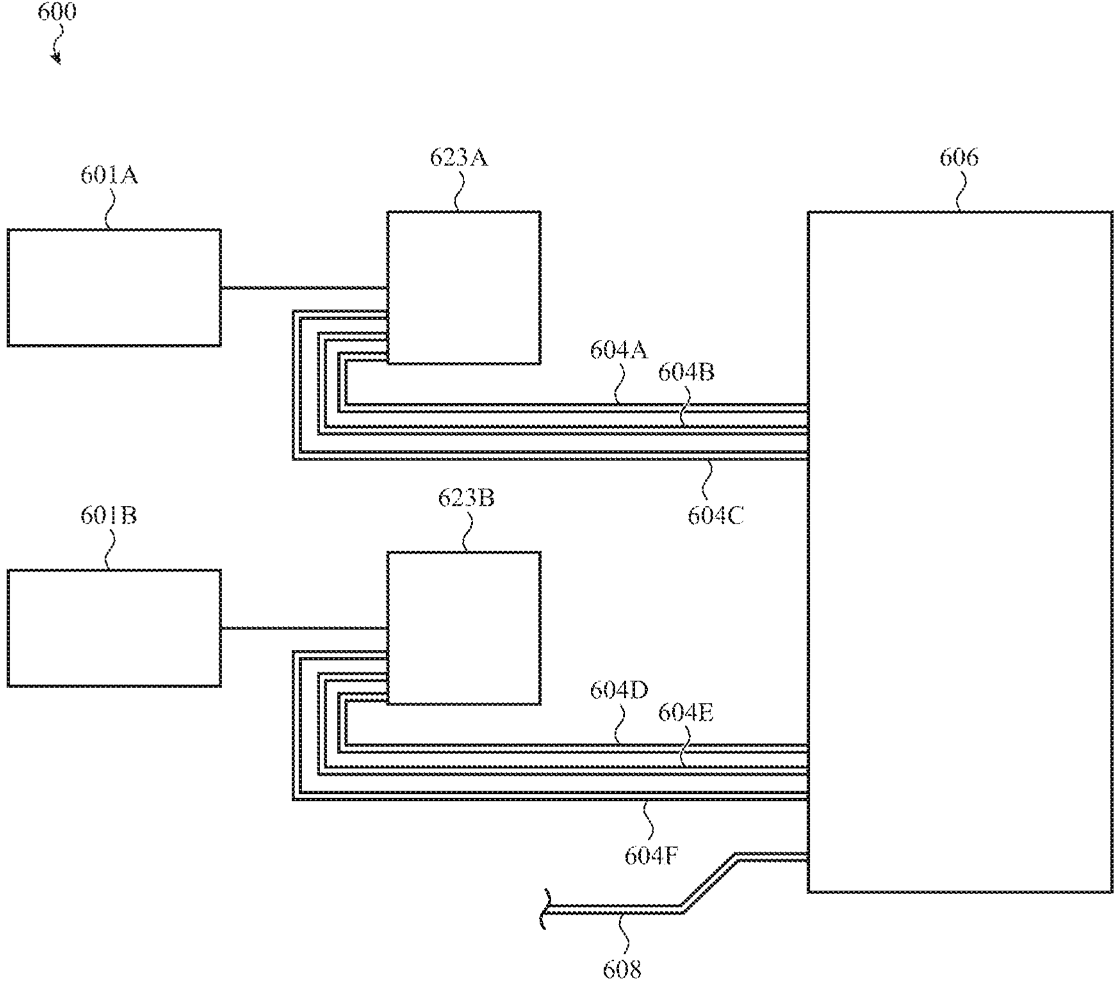
FIG. 6 depicts an example multiplexing system, including a number of light emitters, a number of Echelle demultiplexers assigned to each of the number of light emitters, and a multiplexer configured to combine light.

FIG. 6 depicts an example multiplexing system 600 including a first multi-wavelength light emitter 601A and a second multi-wavelength light emitter 601B configured to direct light into a first Echelle demultiplexer 623A and a second Echelle demultiplexer 623B, respectively. As depicted in FIG. 6, the Echelle demultiplexers 623A and 623B may have more than two outputs to transmit more than two split light components each to a multiplexer 606. Since Echelle demultiplexers 623A and 623B are provided, a large number of output channels may be supported and the first and the second multi-wavelength light emitters 601A and 601B may emit light with more than two spectroscopically distinct wavelengths. For example, though three output channels are depicted with respect to each Echelle demultiplexer 623A and 623B, any number of output channels may be provided. For example, ten or twenty output channels may be provided with each Echelle demultiplexer 623A and 623B, though the number of output channels is not limited to such.

As discussed with respect to FIGS. 3 and 4, above, a multi-wavelength light emitter may emit light outputs containing multiple spectroscopically distinct wavelengths. By incorporating multi-wavelength light emitters instead of single-wavelength light emitters, a cost, complexity, spatial requirement, and/or power consumption of a multiplexing system may be reduced. In addition, the number of spectroscopically distinct wavelengths present in the multiplexing system may remain consistent so that spectroscopically valuable information is not lost even when reducing the number of light emitters.

A first multi-wavelength light emitter 601A may emit a first light output toward a first Echelle demultiplexer 623A. The first light output may comprise a number of spectroscopically distinct wavelengths. In the depicted example, the first light output comprises three spectroscopically distinct wavelengths, but may, in some embodiments, comprise any number of spectroscopically distinct wavelengths such as five, ten, twenty, fifty, and so on. For example, a tunable laser, as a multi-wavelength light emitter, with a 50 nm to 100 nm bandwidth may emit a light output with 10 or 20 spectroscopically distinct wavelengths. The number of spectroscopically distinct wavelengths may correspond to a number of output waveguides coupled to an output of the Echelle demultiplexers.

After the first multi-wavelength light emitter 601A emits the first light output toward the first Echelle demultiplexer 623A, the first Echelle demultiplexer 623A may separate the first light output into multiple split light outputs and may direct each respective split light output to an equivalent number of input waveguides 604A-604C. The first Echelle demultiplexer 623A may include a diffractive grating with a number of reflective facets. Based on properties of the diffractive grating, different wavelengths of light may be reflected from the diffractive grating at different angles. From known characteristics of the first light output (e.g., the wavelengths present in the first light output), a location of each split light output may be determined and a number of input waveguides may be provided at the location of each split light output.

For example, a first light output from the first multi-wavelength light emitter 601A may come into contact with a diffractive grating and may split into three split light outputs (e.g., a first split light output, a second split light output, and a third split light output). A first split light output having a first wavelength may be directed to a first input waveguide 604A and may be directed, via the first input waveguide 604A, to a first channel of a multiplexer 606. A second split light output having a second wavelength may be directed to a second input waveguide 604B and may be directed, via the second input waveguide 604B, to a second channel of the multiplexer 606. Similarly, a third split light output having a third wavelength may be directed to a third input waveguide 604C and may be directed, via the third input waveguide 604C, to a third channel of the multiplexer 606. The first split light output, the second split light output, and the third split light output may have spectroscopically unique wavelengths separated by a length of, for example, between 3 nm and 15 nm, as described above. Each of the input waveguides 604A-604C may connect a respective output channel of the first Echelle demultiplexer 623A to an input channel of the multiplexer 606.

Similarly, the second multi-wavelength light emitter 601B may emit a second light output toward the second Echelle demultiplexer 623B. After the second Echelle demultiplexer 623B receives the second light output, the second Echelle demultiplexer 623B may separate the second light output into multiple split light outputs and may direct each respective split light output to an equivalent number of input waveguides 604D-604F. The second Echelle demultiplexer 623B may include a diffractive grating with a number of reflective facets. Based on properties of the diffractive grating, different wavelengths of light may be reflected from the diffractive grating at different angles. From known characteristics of the second light output (e.g., the wavelengths present in the second light output), a location of each split light output may be determined and a number of input waveguides may be provided at the location of each split light output.

With respect to the second Echelle demultiplexer 623B, a second light output from the second multi-wavelength light emitter 601B may come into contact with a diffractive grating and may split into three split light outputs (e.g., a fourth split light output, a fifth split light output, and a sixth split light output). A fourth split light output having a fourth wavelength may be directed to a fourth input waveguide 604D and may be directed, via the fourth input waveguide 604D, to a fourth channel of a multiplexer 606. A fifth split light output having a fifth wavelength may be directed to a fifth input waveguide 604E and may be directed, via the fifth input waveguide 604E, to a fifth channel of the multiplexer 606. Similarly, a sixth split light output having a sixth wavelength may be directed to a sixth input waveguide 604F and may be directed, via the sixth input waveguide 604F, to a sixth channel of the multiplexer 606. The fourth split light output, the fifth split light output, and the sixth split light output may have spectroscopically unique wavelengths separated by a length of, for example, between 3 nm and 15 nm, as described above. Each of the input waveguides 604D-604F may connect a respective output channel of the first Echelle demultiplexer 623A to an input channel of the multiplexer 606.

Furthermore, the fourth split light output, the fifth split light output, and the sixth split light output may have spectroscopically unique wavelengths with respect to the first split light output, the second split light output, and the third split light output, as discussed above. In this way, the multiplexer 606 may be configured to receive six spectroscopically unique inputs as received as six spaced input channels.

The remaining structures in the multiplexing system 600 may operate in a manner similar to that discussed in reference to FIGS. 1-5B. For example, the input waveguides 604A-604F may direct light to channels of a multiplexer 606 which may combine the light into a combined (e.g., multiplexed) light output. The combined light output may exit the multiplexer 606 through an output waveguide 608. Additional features of the multiplexing system 600 may exist as discussed with respect to equivalent features in FIGS. 1-5B.

As depicted in FIG. 6, the first, the second, and the third input waveguides 604A-604C are unequally spaced with respect to the fourth, the fifth, and the sixth input waveguides 604D-604F. In accordance with the provided disclosure, this arrangement is merely for graphical simplicity and is not necessarily to scale. In some embodiments, each of the input waveguides 604A-604F may be equally spaced. Further, in some embodiments, the input waveguides 604A-604F may be spaced by about 3 nm to 15 nm and/or may be spaced in accordance with a wavelength difference of the light traveling through the input waveguides 604A-604F.

The first and the second multi-wavelength light emitters 601A and 601B may emit light outputs with an equivalent number of wavelengths or may emit light outputs with a different number of wavelengths. For example, the multi-wavelength light emitters 601A and 601B may each emit a light output with three spectroscopically distinct wavelengths. In such embodiments, the Echelle demultiplexers 623A and 623B may comprise an equivalent number of output channels. In additional or alternative embodiments, the Echelle demultiplexers may comprise different numbers of output channels even if the first and the second multi-wavelength light emitters 601A and 601B emit light outputs with an equivalent number of wavelengths.

In some embodiments, the multi-wavelength light emitters 601A and 601B may emit light outputs with a different number of wavelengths. For example, the multi-wavelength light emitter 601A may emit a first light output with ten spectroscopically distinct wavelengths and the multi-wavelength light emitter 601B may emit a second light output with twenty spectroscopically distinct wavelengths. In such an example, the first Echelle demultiplexer 623A may comprise ten output channels and the second Echelle demultiplexer 623B may comprise twenty output channels. The number of spectroscopically distinct wavelengths and output channels provided above are merely for explanatory purposes and any number of either may be provided in accordance with the provided disclosure.

Figure 7A:
FIG. 7A depicts a number of light emitters, an Echelle demultiplexer assigned to all of the number of light emitters, and a multiplexer configured to combine light.
Figure 7A:
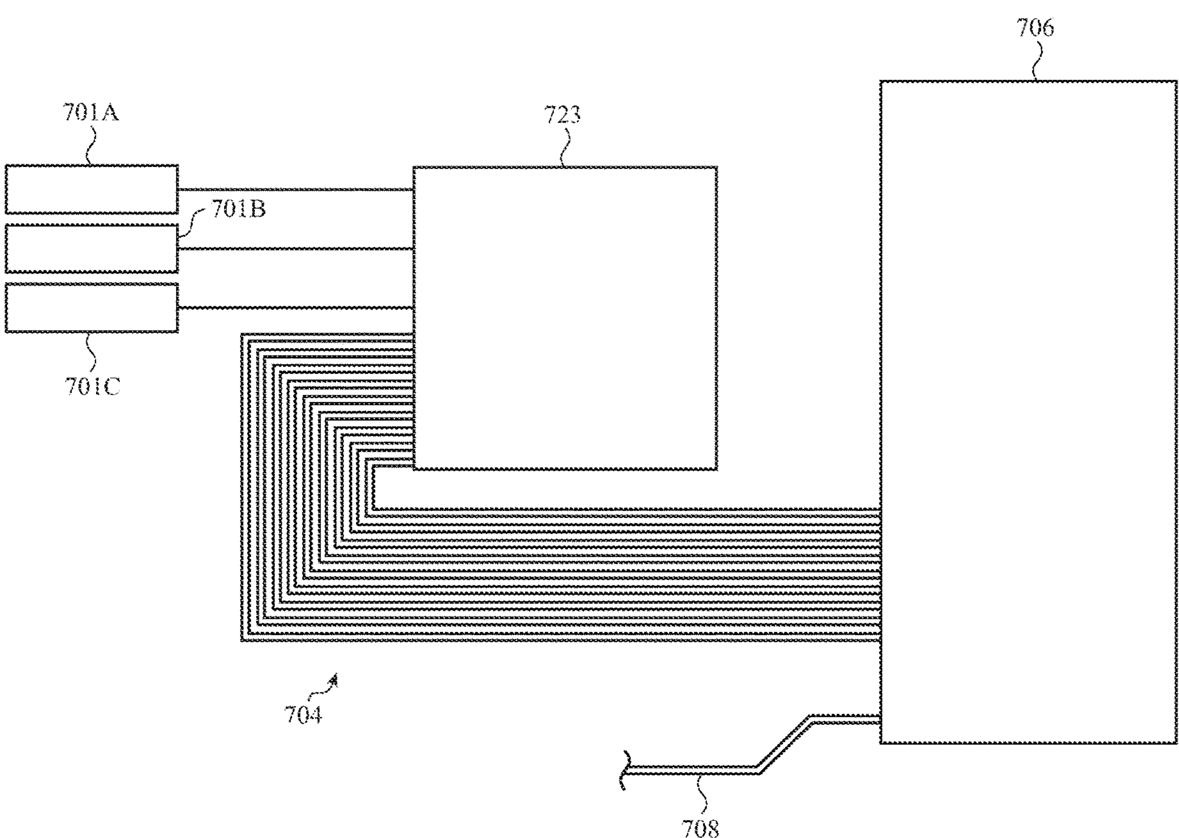

FIG. 7A depicts a multiplexing system 700 where a number of multi-wavelength light emitters 701A-701C are inputted into a common Echelle demultiplexer 723 assigned to all of the number of multi-wavelength light emitters 701A-701C, and a multiplexer 706 configured to combine light output from the Echelle demultiplexer 723.

As described with respect to FIGS. 3-6, each of the multi-wavelength light emitters 701A-701C may be configured to emit a light output having a number of spectroscopically unique wavelengths. In the depicted embodiment, each of the multi-wavelength light emitters 701A-701C emits a light output having three spectroscopically unique wavelengths for a total of nine spectroscopically unique wavelengths for the total of multi-wavelength light emitters 701A-701B. As discussed above, the number of spectroscopically unique wavelengths available is not limited to this particular number. For example, a tunable laser with 50 nm or 100 nm bandwidth may have ten or twenty spectroscopically unique wavelengths. In a system with three such tunable lasers, this may result in 30 or 60 spectroscopically unique wavelengths input into an Echelle demultiplexer 723.

Figure 7B:
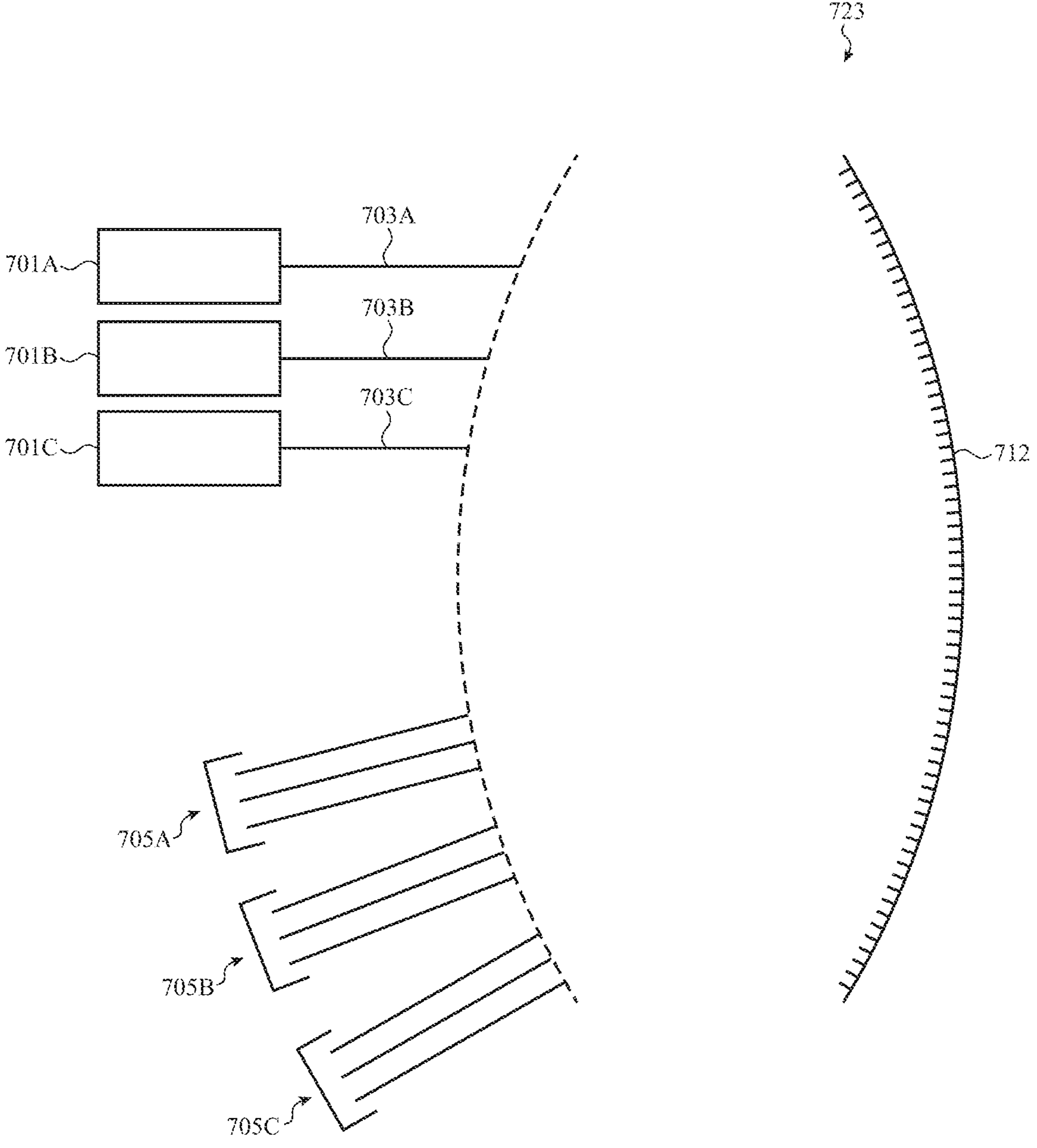
FIG. 7B depicts a number of light emitters configured to emit light outputs to input channels of an Echelle demultiplexer, and associated diffractive grating, and a number of demultiplexed light outputs from the Echelle demultiplexer.

As will be shown in FIG. 7B, each of the multi-wavelength light emitters 701A-701C may emit a light output having three spectroscopically unique wavelengths into an input channel of an Echelle demultiplexer 723. As discussed herein, a diffraction grating of the Echelle demultiplexer 723 may separate each of the spectroscopically unique wavelengths into unique split light outputs. Each of the multi-wavelength light emitters 701A-701C may be separated into three split light outputs, via the Echelle demultiplexer 723, such that nine total split light outputs are directed to respective input waveguides 704 and to the multiplexer 706. The input waveguides 704 may comprise nine individual input waveguides as depicted in FIG. 7A.

The remaining structures in the multiplexing system 700 may operate in a manner similar to that discussed in reference to FIGS. 1-6. For example, the input waveguides 704 may direct light to channels of a multiplexer 706 which may combine the light into a combined (e.g., multiplexed) light output. The combined light output may exit the multiplexer 706 through an output waveguide 708. Additional features of the multiplexing system 700 may exist as discussed with respect to equivalent features in FIGS. 1-6.

FIG. 7B depicts an internal view of an Echelle demultiplexer 723 with respect to three light outputs 703A-703C emitted from respective multi-wavelength light emitters 701A-701C. As discussed above, each of the multi-wavelength light emitters 701A-701C may emit light output 703A-703C, respectively, with three spectroscopically unique wavelengths. It is again noted that the number of spectroscopically unique wavelengths emitted by a multi-wavelength light emitter is not limited to such and may include more or less spectroscopically unique wavelengths.

As each of the light outputs 703A-703C enter the Echelle demultiplexer 723, via, for example, input channels of the Echelle demultiplexer 723, the light outputs 703A-703C may be directed to locations on a diffraction grating 712. Refer to FIG. 2, and the associated description, for further description on such multiplexers and demultiplexers.

It is noted that the Echelle demultiplexer 723 depicted in FIG. 7B is depicted in a simplified form. An Echelle demultiplexer 723 used in accordance with the provided disclosure may include any Echelle demultiplexer 723 and may include any number of input channels, internal structures, diffraction grating geometry, and so on.

Based on properties of the diffraction grating 712, wavelength components of the light outputs 703A-703C may reflect from the diffraction grating 712 at different angles and may enter different input waveguides as depicted in FIG. 7A. For example, in the depicted system, a first light output 703A emitted by a first multi-wavelength light emitter 701A may be split into three split light components 705A (e.g., a first split light component, a second split light component, and a third split light component). Similarly, a second light output 703B emitted by a second multi-wavelength light emitter 701B may be split into three split light components 705B (e.g., a fourth split light component, a fifth split light component, and a sixth split light component), and a third light output 703C emitted by a third multi-wavelength light emitter 701C may be split into three split light components 705C (e.g., a seventh split light component, an eighth split light component, and a ninth split light component).

Each of the nine split light components may be spectroscopically unique and may have wavelengths differing by about 3 nm to about 15 nm, in some embodiments. Though FIG. 7B depicts each of the split light components 705A-705C in groups, it is understood that each individual split light component may be individually spaced equally, with respect to each other.

Figure 8:
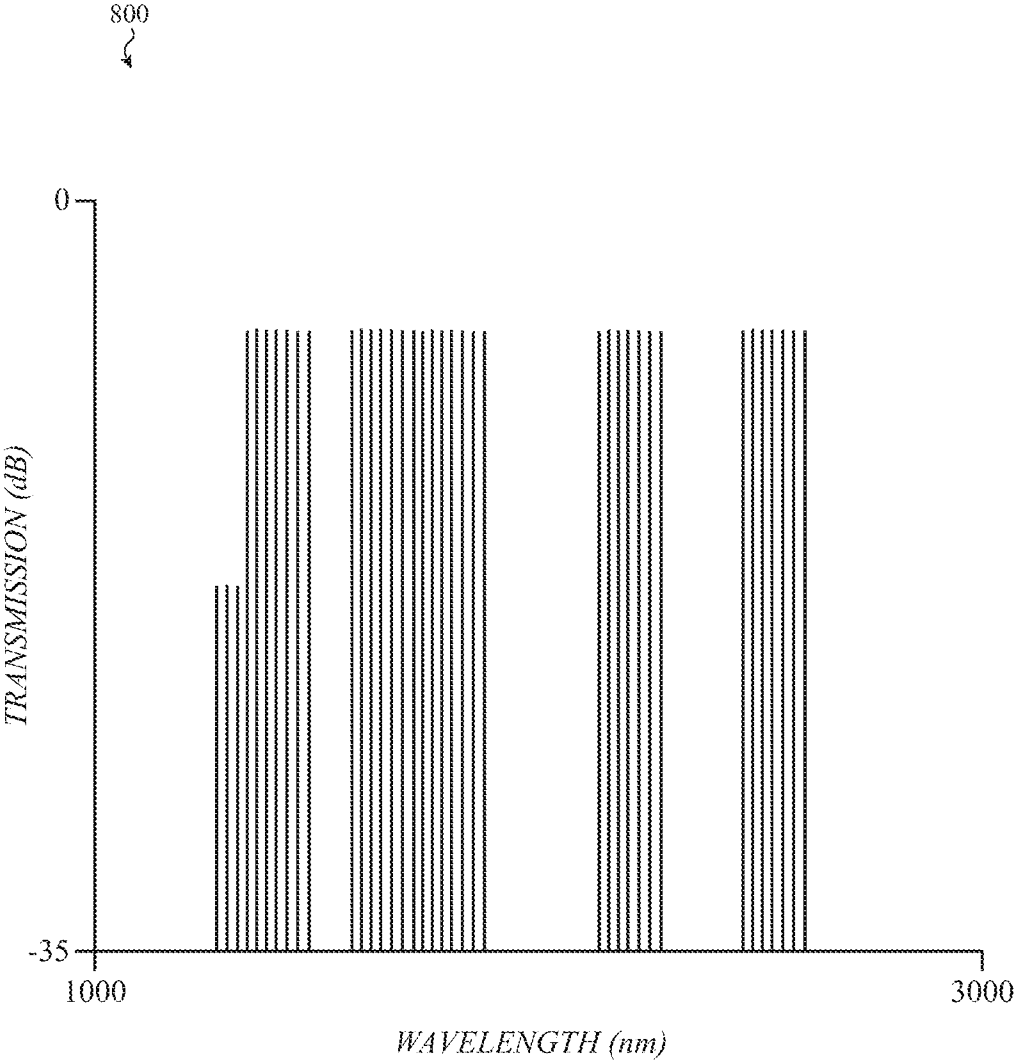
FIG. 8 illustrates an example spectrographic signal including a number of optical inputs.

FIG. 8 depicts a potential spectrographic output 800 as an output of a provided multiplexer. As understood by a person of ordinary skill in the art, spectroscopic systems may measure interactions between electromagnetic radiation and matter. When an incident beam of light impinges on a piece of matter, the incident beam of light may scatter or may otherwise be absorbed by the matter resulting in excited electronics emitting electromagnetic radiation, which may be measured by a spectrometer.

The spectrographic output 800 includes a number of lines each corresponding to a particular wavelength. The lines are each associated with a transmission level, in decibels (dB), and correspond to an amount of light present for each particular wavelength. By comparing this graphic with known spectroscopic values for known materials, a chemical makeup of an object impinged by a beam of light may be determined. The spectrographic output 800 is merely provided as an example and a multiplexer or demultiplexer may have any utility as understood by one of ordinary skill in the art.

The spectrographic output 800 may include light of different wavelengths that are substantially equally spaced from one another. The distance between the spacing may correspond to distances between wavelengths input to a multiplexer and/or distances between channels on an associated multiplexer. For example, each emission line (on the graph of FIG. 8) may be spaced between about 3 nm to 15 nm apart. Due, in part, to the narrow, closely spaced spectrographic output 800, a chemical makeup and/or property of a measured material may be taken across a large number of wavelengths with a high resolution. In some embodiments, a minimum spectroscopically unique wavelength difference may be selected (as discussed with respect to FIGS. 1-7B) for the sake of maximizing a resolution of a spectrographic output 800.

The spectrographic output 800 may also be normalized so that the transmission (as measured in dB) appears substantially equivalent for respective emissions. This may be done to emphasize gaps (e.g., band gaps) where no wavelength is received by a spectrograph. This may result in determining where a band gap (e.g., an energy range where no electron states can exist) exists in, for example, an insulator and/or a semiconductor. In alternative or additional embodiments, the spectrographic output 800 may not be normalized so that an amount of a received wavelength may be more easily discernable. In alternative or additional embodiments, the normalized and un-normalized output may be stacked together in the same graph.

Although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its description in a drawing does not imply that the illustrated process is exclusive of other variations and modification thereto, does not imply that the illustrated process or any of its steps are necessary to one or more of the examples, and does not imply that the illustrated process is preferred.

Representative applications of methods and apparatuses according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

Other examples and implementations are within the scope and spirit of the disclosure and appended claims. For example, flexible capacitive sensors may be used on wearable fabrics, in fabric scales, and in other pressure sensing/measuring systems. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A multiplexing system comprising:

a plurality of multi-wavelength light emitters, each configured to emit a corresponding multi-wavelength light output;

a demultiplexer configured to receive the corresponding multi-wavelength light outputs from each of the plurality of multi-wavelength light outputs and to split the corresponding multi-wavelength light outputs into a plurality of unique outputs, wherein each multi-wavelength emitter of the plurality of multi-wavelength light emitters is directly connected to a different corresponding input of the demultiplexer; and a light combiner configured to combine the plurality of unique outputs into an output waveguide.

2. The multiplexing system of claim 1, wherein the plurality of multi-wavelength light emitters comprises:

a first multi-wavelength light emitter;

a second multi-wavelength light emitter; and a third multi-wavelength light emitter.

3. The multiplexing system of claim 2, wherein:

each of the plurality of multi-wavelength light emitters is configured to emit three corresponding unique wavelengths of light; and the plurality of unique outputs comprises nine unique outputs.

4. The multiplexing system of claim 1, wherein:

each of the plurality of multi-wavelength light emitters comprises a tunable laser.

5. The multiplexing system of claim 1, wherein the demultiplexer is an Echelle demultiplexer.

6. The multiplexing system of claim 1, wherein the combiner is an Echelle multiplexer.

7. A multiplexing system comprising:

a first multi-wavelength light emitter configured to emit a first multi-wavelength light output;

a second multi-wavelength light emitter configured to emit a second multi-wavelength light output;

a third multi-wavelength light emitter configured to emit a third multi-wavelength light output;

a demultiplexer configured to receive and split the first multi-wavelength light output, the second multi-wavelength light output, and the third multi-wavelength light output into a plurality of unique outputs, wherein each of the first multi-wavelength light emitter, the second multi-wavelength light emitter, and the third multi-wavelength light emitter is directly connected to a different corresponding input of the demultiplexer; and a light combiner configured to combine the plurality of unique outputs into an output waveguide.

8. The multiplexing system of claim 7, wherein:

the first multi-wavelength light output, the second multi-wavelength light output, and the third multi-wavelength light output each comprise three corresponding wavelengths of light; and the plurality of unique outputs comprises nine unique outputs.

9. The multiplexing system of claim 7, wherein:

the first multi-wavelength light output comprises a plurality of wavelengths that are spaced by at least 3 nm to 15 nm.

10. The multiplexing system of claim 7, wherein:

the first multi-wavelength light emitter, the second multi-wavelength light emitter, and the third multi-wavelength light emitter each comprise a tunable laser.

11. The multiplexing system of claim 7, wherein the demultiplexer is an Echelle demultiplexer.

12. The multiplexing system of claim 7, wherein the combiner is an Echelle multiplexer.

13. A method for multiplexing light, the method comprising:

emitting a first light output from a first multi-wavelength light emitter;

emitting a second light output from a second multi-wavelength light emitter;

emitting a third light output from a third multi-wavelength light emitter;

demultiplexing each of the first light output, the second light output, and the third light output, using a demultiplexer, into a plurality of unique outputs, wherein each of the first multi-wavelength light emitter, the second multi-wavelength light emitter, and the third multi-wavelength light emitter is directly connected to a different corresponding input of the demultiplexer; and multiplexing the plurality of unique outputs into an output waveguide using a multiplexer.

14. The method of claim 13, wherein the demultiplexer is an Echelle demultiplexer.

15. The method of claim 13, wherein the multiplexer is an Echelle multiplexer.

16. The method of claim 13, wherein:

the first multi-wavelength light emitter, the second multi-wavelength light emitter, and the third multi-wavelength light emitter each comprise a tunable laser.

* * * * *